United States Patent
Haley et al.

(10) Patent No.: US 6,222,285 B1
(45) Date of Patent: Apr. 24, 2001

(54) INTELLIGENT SWITCH CONTROL CIRCUIT

(75) Inventors: Edward M. Haley, Binghampton, NY (US); James M. Robitaille, Williamsport, PA (US); Robert L. Crevling, Jr., Williamsport, PA (US); Mark E. Baer, Williamsport, PA (US)

(73) Assignee: Shop Vac Corporation, Williamsport, PA (US)

( * ) Notice: Subject to any disclaimer, the term of this patent is extended or adjusted under 35 U.S.C. 154(b) by 0 days.

(21) Appl. No.: 09/391,283

(22) Filed: Sep. 7, 1999

(51) Int. Cl.$^7$ .................................................. H01H 47/20
(52) U.S. Cl. .............................. 307/129; 307/38; 307/39; 307/125
(58) Field of Search .................................. 307/38, 39, 40, 307/125, 129, 131; 340/310.01; 15/319

(56) References Cited

U.S. PATENT DOCUMENTS

| | | | |
|---|---|---|---|
| 3,319,282 | 5/1967 | MacFarland | 15/319 |
| 3,566,198 | 2/1971 | Delahunty | 317/33 |
| 4,238,689 | 12/1980 | Breslin et al. | 307/42 |
| 4,246,492 | 1/1981 | Vandling | 307/40 |
| 4,357,729 | 11/1982 | Vander Molen et al. | 15/319 |
| 4,659,941 | 4/1987 | Quiros et al. | 307/11 |
| 4,794,271 | 12/1988 | McNair | 307/38 |
| 4,825,140 * | 4/1989 | St. Louis | 323/237 |
| 4,970,623 | 11/1990 | Pintar | 361/187 |
| 4,993,194 | 2/1991 | Kasper et al. | 15/319 |
| 5,047,597 | 9/1991 | Jailor | 200/5 |
| 5,099,157 | 3/1992 | Meyer | 307/632 |
| 5,120,983 | 6/1992 | Sämann | 307/38 |
| 5,256,906 | 10/1993 | Tsuge et al. | 307/39 |
| 5,281,859 | 1/1994 | Crane | 307/139 |
| 5,424,903 | 6/1995 | Schreiber | 361/166 |
| 5,442,335 | 8/1995 | Cantin et al. | 340/825.71 |
| 5,541,457 | 7/1996 | Morrow | 307/38 |
| 5,598,039 | 1/1997 | Weber | 307/38 |
| 5,654,595 | 8/1997 | Ferguson | 307/139 |
| 5,659,209 | 8/1997 | Huen | 307/125 |
| 5,708,551 * | 1/1998 | Bosatelli | 307/38 |
| 5,731,947 | 3/1998 | Hirose | 361/160 |
| 5,747,973 | 5/1998 | Robitaille et al. | 323/239 |
| 5,955,791 * | 9/1999 | Irlander | 307/38 |
| 6,044,519 * | 4/2000 | Hendrix | 15/319 |

* cited by examiner

Primary Examiner—Josie Ballato
Assistant Examiner—Roberto Rios
(74) Attorney, Agent, or Firm—Marshall, O'Toole, Gerstein, Murray & Borun (57) ABSTRACT

A sensing circuit is useful with a power outlet and a power tool having power supplied thereto via the power outlet. The sensing circuit includes a generator, a transmitter, and a detector. A first signal having a high frequency is developed by the generator and supplied to a first terminal of the power outlet by the transmitter. The detector is coupled to the second terminal of the power outlet and tuned in accordance with the high frequency to develop a second signal indicative of whether the power tool is coupled to the power outlet. The sensing circuit may be used in conjunction with a regulating circuit and a two-position switch useful for controlling the electrical energy supplied to the power tool and a vacuum cleaner having the power outlet disposed thereon.

35 Claims, 6 Drawing Sheets

INTELLIGENT SWITCH CONTROL CIRCUIT

TECHNICAL FIELD

The present invention relates generally to power control circuits and, more particularly, to such circuits that may be used to control current consumption of a vacuum cleaner when operated in conjunction with a power tool.

BACKGROUND ART

It is often desirable when operating two motors simultaneously to provide for the automatic activation (or deactivation) of one of the motors, referred to as the secondary load, in response to the activation (or deactivation) of the other motor, referred to as the primary load. For example, operation of a vacuum cleaner motor (hereinafter "vacuum motor") has been conditioned upon the operation of a power tool. In this way, the vacuum motor may be automatically activated to collect particulate matter generated by the power tool. Such conditioned operation has been provided by a control circuit that generally includes a current sensor to detect current flowing to the power tool (see, e.g., Samann U.S. Pat. No. 5,120,983). The current sensor, in turn, drives a triac or other switching element disposed between the power supply and the vacuum motor to permit current flow thereto.

It is also desirable to operate the vacuum motor independently of the power tool. Accordingly, such control circuits have included a three-position switch to determine whether the vacuum motor is to be inactive ("OFF"), operated independently from the power tool ("ON"), or activated in coordination with the power tool ("AUTO"). See Robitaille et al. U.S. Pat. No. 5,747,973. However, having to toggle between the three switch positions may be both inconvenient and confusing for a user of the vacuum cleaner.

SUMMARY OF THE INVENTION

In accordance with one aspect of the present invention, a sensing circuit is useful with a power outlet and a device having power supplied thereto via the power outlet. The sensing circuit includes a generator that develops a first signal and a transmitter coupling the generator to a first terminal of the power outlet to supply the first signal thereto. The sensing circuit further includes a detector coupled to a second terminal of the power outlet. The detector is tuned to the high frequency of the first signal to develop a second signal indicative of whether the device is coupled to the power outlet.

In a preferred embodiment, the generator includes an oscillator and the transmitter includes a transformer coupling the oscillator to the first terminal of the power outlet. The detector may include a bandpass-tuned amplifier tuned in accordance with the high frequency of the first signal. Alternatively, the detector includes a receiver tuned in accordance with the high frequency of the first signal and a comparator coupled to the receiver to develop the second signal. The receiver may include an AC-to-DC converter that develops a DC signal supplied to the comparator for comparison with a threshold voltage.

According to another preferred embodiment, the sensing circuit is useful in combination with a load having the power outlet disposed thereon and a regulator coupled to the detector and enabled by the second signal to condition operation of the load on operation of the device. The load preferably includes a two-position switch that controls whether power is supplied to the load and the device. The regulator preferably includes a current sensor coupled to the power outlet for developing a third signal indicative of whether power is being supplied to the device. The device may include an auxiliary power tool and the power outlet may be disposed on a vacuum cleaner. The sensing circuit may be useful in further combination with a two-position switch such that the two-position switch couples the second terminal of the power outlet to a high voltage line of a power source.

In accordance with another aspect of the present invention, a control circuit controls operation of a first load in connection with operation of a second load powered via a power outlet. The control circuit includes a signal generator and a detector coupled to the power outlet to develop a first signal indicative of whether the second load is coupled to the power outlet. The control circuit further includes a sensor coupled to the power outlet to develop a second signal indicative of whether power is supplied to the second load and a switch circuit coupled to the first load and responsive to the first and second signals to provide for operation of the first load conditioned upon operation of the second load.

In a preferred embodiment, the power outlet has a first terminal coupled to the signal generator and a second terminal coupled to the detector. The control circuit preferably further includes a transmitter such that an oscillator of the signal generator is coupled to the first terminal of the power outlet by the transmitter.

According to another preferred embodiment, the switch circuit includes a triac coupled to the first load and a triac triggering circuit responsive to the second signal. The triac triggering circuit preferably includes a phase control circuit to adjust power supplied to the first load. The control circuit still further preferably includes a two-position switch that couples the power outlet and the first load to a power source when disposed in a closed position. The switch circuit may allow power to be supplied to the first load when the two-position switch is disposed in the closed position and the first signal indicates the second load is not coupled to the power outlet.

The switch circuit preferably does not allow power to be supplied to the first load when the two-position switch is disposed in the closed position, the first signal indicates that the second load is coupled to the power outlet, and the second signal indicates that current is not flowing to the second load.

The control circuit still further preferably includes a sensor that develops a third signal indicative of a parameter of the electrical energy supplied to at least one of the first and second loads. The phase control circuit variably adjusts power supplied to the first load in accordance with the third signal when the two-position switch is disposed in the closed position, the first signal indicates that the second load is coupled to the power outlet, and the second signal indicates that current is flowing to the second load.

In accordance with yet another aspect of the present invention, a vacuum cleaner is useful in conjunction with a power tool. The vacuum cleaner includes a power outlet configured to supply power to the power tool and a control circuit coupled to the power outlet. The control circuit, in turn, includes a generator coupled to a first terminal of the power outlet that develops a first signal and a detector coupled to a second terminal of the power outlet and tuned in accordance with the high frequency of the first signal to develop a second signal indicative of whether the power tool is coupled to the power outlet. The control circuit further includes a switch and a regulating circuit responsive to the second signal and the state of the switch to control power supplied to the motor of the vacuum cleaner.

According to a preferred embodiment, the switch includes a two-position switch and the regulating circuit supplies a predetermined maximum magnitude of power to the motor when the two-position switch is disposed in a closed position and the second signal indicates that the power tool is not coupled to the power outlet. The regulating circuit preferably includes a phase control circuit.

According to another preferred embodiment, the control circuit further includes a transmitter that couples the generator to the first terminal of the power outlet. The transmitter preferably includes a transformer and the generator includes an oscillator coupled to the transformer.

The detector may include a bandpass-tuned amplifier tuned in accordance with the high frequency of the first signal and the detector preferably further includes an AC-to-DC converter coupled to the bandpass-tuned amplifier and a comparator coupled to the AC-to-DC converter. The comparator is preferably responsive to a predetermined threshold to develop the second signal.

According to yet another preferred embodiment, the regulating circuit includes a sensor coupled to the power outlet that develops a third signal indicative of whether power is flowing to the power tool. The regulating circuit still further preferably includes an amplifier coupled to the sensor and enabled by the second signal.

In accordance with still another aspect of the present invention, a vacuum cleaner controls operation of a first load in connection with operation of a second load. The vacuum cleaner includes a power outlet adapted to couple the second load to the vacuum cleaner and a two-position switch having a first position and a second position. The vacuum cleaner further includes a control circuit coupled to the two-position switch and the power outlet. The control circuit conditions the operation of the first load upon the operation of the second load when the two-position switch is disposed in the first position and the control circuit detects that the second load is coupled to the power outlet. The control circuit allows the first load to operate independently of the second load when the control circuit does not detect that the second load has been coupled to the power outlet.

According to a preferred embodiment, the control circuit includes a generator coupled to the power outlet that develops a high frequency signal. The control circuit may include a detector coupled to the power outlet and tuned to detect a high frequency signal to develop a signal indicative of whether the second load is coupled to the power outlet.

The first position and the second position preferably correspond with a closed position and an open position, respectively. The control circuit may not allow power to the first load or the second load when the two-position switch is disposed in the second position.

DESCRIPTION OF THE PREFERRED EMBODIMENT

Figure 1:
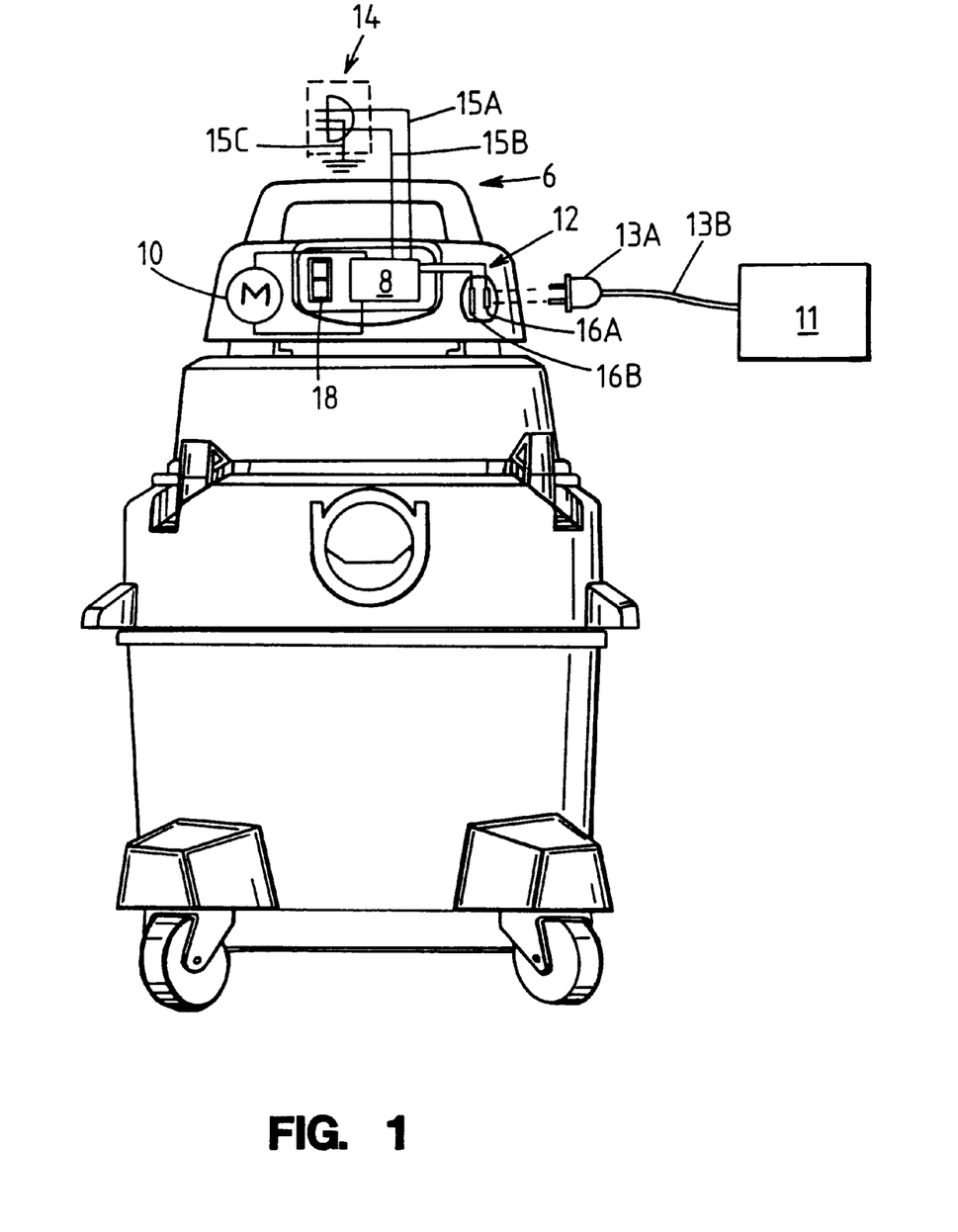
FIG. 1 is a diagrammatic view of a power tool shown together with an elevational view of a vacuum cleaner having a power outlet coupled to a control circuit in accordance with the present invention.

Referring now to FIG. 1, a vacuum cleaner 6 includes a control circuit 8 coupled to a vacuum motor 10. The vacuum motor 10 provides suction useful for collecting particulate matter generated by a power tool 11. The power tool 11 may be coupled to the vacuum cleaner 6 at a power outlet 12 which, in turn, is electrically coupled to the control circuit 8. The power tool 11 includes a male plug 13A disposed at an end of a power cord 13B for engaging the power tool outlet 12. The vacuum motor 10 and the power tool 11 receive power from a power source 14 coupled to the control circuit 8 by a high voltage line 15A and a low voltage line 15B. The power source 14 has a terminal tied to ground by a line 15C. The power source 14 preferably provides AC power at 115 Volts root-mean-square (hereinafter "rms") across the high and low voltage lines 15A and 15B.

The power outlet 12 preferably includes a pair of terminals 16A and 16B configured to accept the male plug 13A of the power tool 11. However, it should be understood that the power outlet 12 may have one or more additional terminals to accommodate the coupling of the power tool 11 to the power source 14. For example, the male plug 13A may include a third prong for a ground connection. However, the terminals 16A and 16B of the power outlet 12 may be of any shape and size, and should not be limited to a configuration suitable for accepting a male plug. In general, the power outlet 12 may have any number of terminals necessary to electrically and/or physically couple the power tool 11 to the power source 14.

Figure 2:
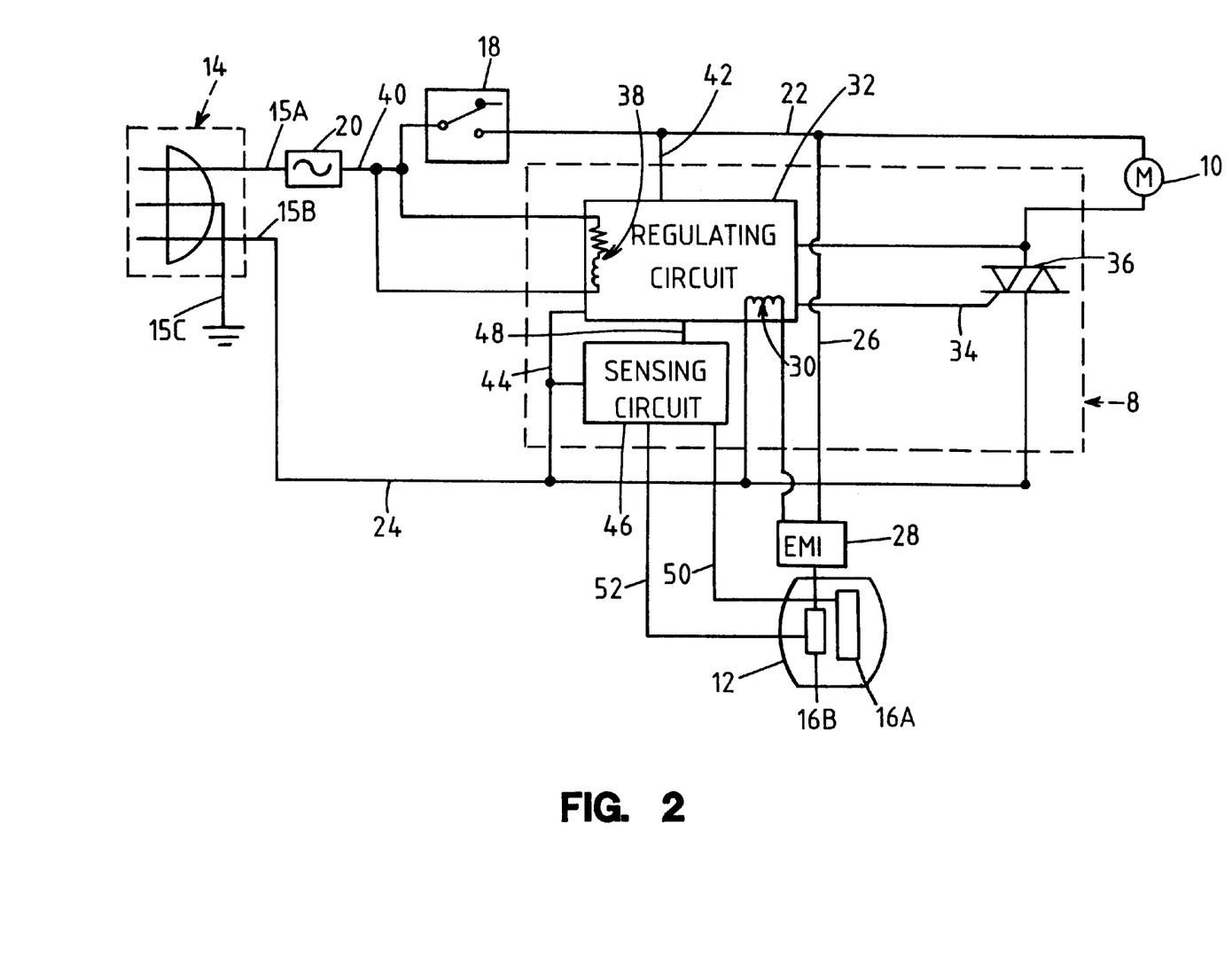
FIG. 2 is a simplified schematic representation of the control circuit of FIG. 1 shown together with the power outlet, a vacuum motor, and a power source.

With reference also to FIG. 2, the vacuum cleaner 6 also includes a two-position switch 18 having a state defined by whether the switch 18 is disposed in a first position or a second position. The switch 18 preferably is configured to have an "OPEN" position and a "CLOSED" position (as best seen in FIG. 2) such that, when disposed in the CLOSED position, the switch 18 electrically couples the vacuum motor 10 and the control circuit 8 to the high voltage line 15A of the power source 14. This connection to the high voltage line 15A may, but need not, further include a 12 Amp circuit breaker 20 (FIG. 2). When the switch 18 is disposed in the OPEN position, the vacuum motor 10 and the control circuit 8 are not electrically coupled to the high voltage line 15A.

Referring now exclusively to FIG. 2, the state of the switch 18 generally controls whether power may be supplied from the power source 14 to the vacuum motor 10 and the power tool 11 (FIG. 1) via lines 22 and 24. One terminal 16A of the power outlet 12 is preferably coupled to the line 22 (and the high voltage line 15A) by a line 26 and an electromagnetic interference (EMI) filter 28, both of which may, but need not, constitute a part of the control circuit 8. The other terminal 16B of the power outlet 12 is coupled to the line 24 (and, therefore, the low voltage line 15B) via the EMI filter 28 and a current sensor 30 of the control circuit 8. The current sensor 30 generally senses whether any current is flowing to the power tool 11 (FIG. 1) via the power outlet 12.

The current sensor 30 preferably constitutes a portion of a regulating circuit 32 that regulates the electrical energy consumed by the vacuum motor 10 to limit the total amount of electrical energy or power drawn by the vacuum motor 10 and the power tool 11. The regulating circuit 32 may regulate the current drawn by the vacuum motor 10 to limit the total current to a predetermined level (rms). Consequently, the regulating circuit 32 may be considered a current regulator. Alternatively, the regulating circuit 32 regulates the voltage applied to the vacuum motor 10 to thereby limit the current drawn thereby.

With continued reference to FIG. 2, the regulating circuit 32 develops a triac trigger signal on a line 34 that variably adjusts the duty cycle of a triac 36 that couples the vacuum motor 10 to the line 24 and the low voltage line 15B of the power source 14. The triac trigger signal, in turn, is developed from a signal generated by a sensor indicated generally at 38. The signal developed by the sensor 38 is generally indicative of a parameter of the electrical energy provided to at least one of the power tool 11 and the vacuum motor 10. To this end, the sensor 38 taps a line 40 coupling the high voltage line 15A to the switch 18 such that the signal is representative of the total current flowing to the vacuum motor 10 and the power tool 11. Alternatively, the sensor 38 develops a signal representative of other electrical energy parameters, such as the electrical power or current drawn by the power tool 11 alone.

The regulating circuit 32 is supplied with power via lines 42 and 44 in the event that the switch 18 is disposed in the CLOSED position. The lines 42 and 44 should be understood to be representative of any number of electrical connections to the lines 22 and 24, respectively.

In accordance with one aspect of the present invention, the regulating circuit 32 is controlled by a sensing circuit 46, which provides an enabling signal on a line 48. The enabling signal is indicative of whether the sensing circuit 46 senses that the power tool 11 (FIG. 1) is coupled to the power outlet 12. For example, the power tool 11 may be considered coupled to the power outlet 12 when the male plug 13A (FIG. 1) of the power tool 12 is inserted into the terminals 16A and 16B of the power outlet 12. However, the power tool 11 and the power outlet 12 may be coupled in any fashion that achieves a connection capable of establishing the supply of power to the power tool 11 via the power outlet 12.

In general, the sensing circuit 46 determines whether the power tool 11 is coupled to the power outlet 12 by transmitting a low voltage, high frequency signal to one of the terminals 16A or 16B of the power outlet 12 via either a line 50 or a line 52, respectively. For instance, the sensing circuit 46 may transmit the high frequency signal over the line leading to the power outlet terminal coupled to the low voltage power line 15B. In that case, the high frequency signal is accordingly transmitted over the line 52 to the terminal 16B. The high frequency signal is then isolated from the power source 14 and the remainder of the control circuit 8 by the EMI filter 28.

If the power tool 11 is coupled to the power outlet 12, the proximity of the two lines in the power cord 13B (FIG. 1) leading to the power tool 11 results in the production of an induced signal in the line coupled to the other terminal 16A. In the exemplary circuit described hereinbelow, a power cord of about four feet in length results in a sufficiently strong induced signal.

The frequency of the induced signal will, therefore, equal the frequency of the signal applied to the terminal 16B. The sensing circuit 46 then detects via the line 50 whether the high frequency signal has been capacitively transferred to the other terminal 16A by evaluating whether the strength of the induced signal (at that high frequency) exceeds a predetermined threshold. If the threshold is exceeded, the sensing circuit 46 modifies the enabling signal on the line 48 accordingly.

Once the enabling signal indicates that the power tool 11 is coupled to the power outlet 12, the regulating circuit 32 causes the vacuum cleaner 6 to enter an AUTO mode wherein operation of the vacuum motor 10 is conditioned upon operation of the power tool 11. In this mode, the vacuum motor 10 will only be provided with power by the regulating circuit 32 if the power tool 11 is activated—despite the switch 18 being disposed in the CLOSED (i.e., "ON") position. Once the power tool 11 is activated, the regulating circuit 32 further controls the amount of power (or current) consumed by the vacuum motor 10 in accordance with the amount of power (or current) consumed by the power tool 11.

If the switch 18 is disposed in the CLOSED position and the sensing circuit 46 provides an enabling signal indicative of the power tool 11 not being coupled to the power outlet 12, the vacuum cleaner 6 enters an INDEPENDENT mode wherein the regulating circuit 32 provides maximum power to the vacuum motor 10. In this mode, the vacuum motor 10 operates independently of the power tool 11 and at the maximum speed permitted during operation within a control circuit configuration such as that shown in FIG. 2. It should be noted that different control circuits may result in slight variations in the maximum speed of vacuum motor operation. For example, if the vacuum motor 10 draws slightly more than 12 Amps at full rated speed, the regulating circuit 12 may control the amount of power (or current) to a slight extent, as will be explained further hereinbelow, to provide a predetermined maximum magnitude of power to the vacuum motor 10.

In an alternative embodiment, components of the control circuit 8 are rearranged to provide power continuously to the power outlet 12 (when the vacuum cleaner 6 is coupled to the power source 14). Those skilled in the art shall comprehend that such a rearrangement may be readily accomplished to change the operational characteristics of the vacuum cleaner 6. Namely, the vacuum cleaner 6 would enter the AUTO mode when the switch 18 is disposed in the OPEN position. Once the switch 18 is toggled to the CLOSED position, the vacuum cleaner 6 would then operate in INDEPENDENT mode. Such an embodiment may, however, be problematic because power would be continuously consumed by the sensing circuit 46, which could then overheat. Moreover, consumer regulatory agencies (e.g., UL®) may not approve of devices having a live power outlet when a power switch is disposed in a position labeled "OFF."

Switching between the AUTO and INDEPENDENT modes is handled by a switch circuit that may be considered to include the triac 36 and portions of the regulating circuit 32 involved in developing triac triggering pulses to control the triac 36. The switch circuit essentially controls whether power is supplied to the vacuum motor 10 once the two-position switch 18 is disposed in the CLOSED position. To this end, the switch circuit is controlled by the sensor 30 and the sensing circuit 46. More particularly, once the sensing circuit 46 senses the power tool 11, the switch circuit is responsive to an indication from the sensor 30 as to whether current is flowing to the power tool. If the sensing circuit 46 does not sense the power tool, the switching circuit does not require an indication from the sensor 30 that current is flowing to the power tool in order to allow power to be supplied to the vacuum motor 10. In this manner, the switch circuit is responsive to both the sensor 30 and the sensing circuit 46 to provide for both independent and conditioned operation of the vacuum motor 10.

The switch circuit should not be understood to be limited to the triac-based configuration of FIG. 2, but rather should be understood to include any switching circuit known to those skilled in the art to toggle between conductive and non-conductive states based on one or more control signals. However, as will be further described hereinbelow, the preferred triac-based switch circuit provides a mechanism for utilizing other portions of the regulating circuit 32 to provide for regulating the power consumed by the vacuum motor 10.

Figure 3:
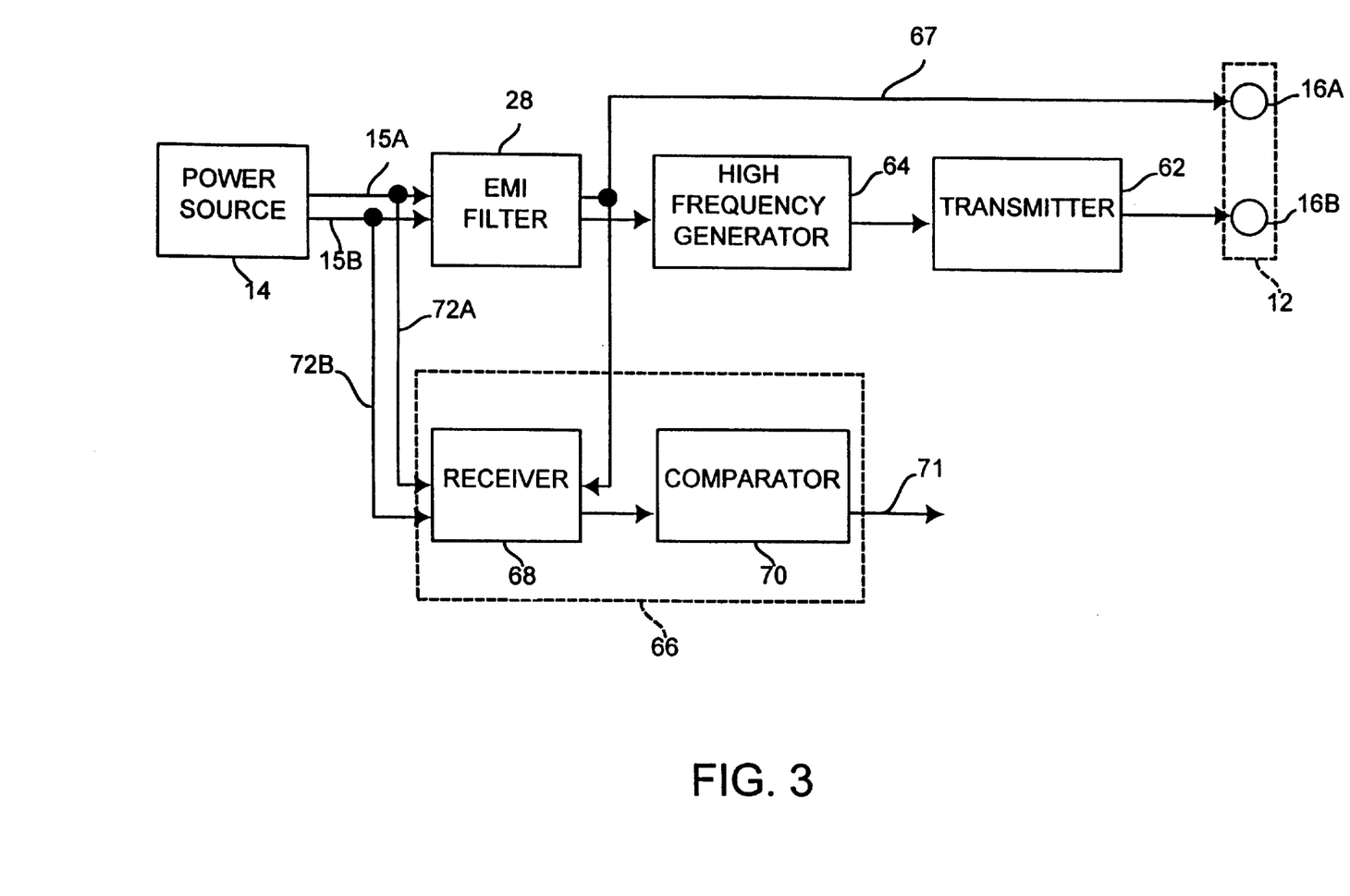
FIG. 3 is a schematic representation of a sensing circuit of the control circuit of FIGS. 1 and 2 in accordance with one aspect of the present invention.

With reference now to FIG. 3, where like elements have been assigned like reference numerals, the sensing circuit 46 is shown diagrammatically in connection with the pair of power lines 15A and 15B from the power source 14 and the terminals 16A and 16B of the power outlet 12. The sensing circuit 46 generally includes a transmitter 62 that couples a high frequency signal developed by a high frequency generator 64 to the terminal 16B of the power outlet 12. The high frequency signal is blocked from back-transmission on the power lines 15A and 15B by the EMI filter 28, which is designed to pass low frequency signals such as a typical 60 Hz line signal. The high frequency signal may have a frequency in range from about 42 kHz to about 60 kHz, and is preferably about 50 kHz. It should be noted, however, that the frequency should not correspond with a sub-harmonic of the power line frequency (i.e., 60 Hz). The high frequency signal should also have a low peak-to-peak voltage relative to the power signal such that the peak-to-peak voltage of the high frequency signal preferably falls in a range from about 0.5 Volts to about 1.5 Volts, and is most preferably about 1.0 Volts. However, this voltage amplitude preference is based, in part, upon the components used in the sensing circuit 46 and the resulting sensitivity thereof. The high frequency signal is also preferably sinusoidal in shape in the interest of promoting optimal coupling between the terminals 16A and 16B.

The sensing circuit 46 also includes a detector 66 coupled to the terminal 16A of the power outlet 12 via a line 67. The detector 66, in turn, includes a receiver circuit 68 tuned to the frequency of the high frequency signal developed by the generator 64. The receiver 68 amplifies any induced signal components at or near the high frequency and provides a signal representative of the strength of those signal components to a comparator 70, which compares the induced signal to a predetermined threshold. The comparator 70 then develops a signal on a line 71 indicative of whether the power tool 11 or any other electrical device is coupled to the power outlet 12 based upon the comparison to the predetermined threshold. The line 71 may correspond with the line 48 of FIG. 2.

The power needed for amplification of the induced signal on the line 67 may be generally provided from the power lines 15A and 15B via lines 72A and 72B, respectively. Alternatively, the amplification power may be converted to DC power by some intermediary apparatus, such as the regulating circuit 32 (FIG. 2).

The above-identified components of the sensing circuit 46 are shown in greater detail in FIG. 4, where again like elements have been identified by like reference numerals. The high frequency generator 64 generally includes an oscillator 80, which may constitute an integrated circuit chip available from National Semiconductor Corp. (Santa Clara, Calif.) as part number 555. As is well known to those skilled in the art, the oscillator 80 may alternatively comprise numerous types of circuits that provide an oscillating waveform at a particular frequency. Therefore, the oscillator 80 and, by implication, the generator 46, should not be limited to the specific hardware described herein.

Figure 4:
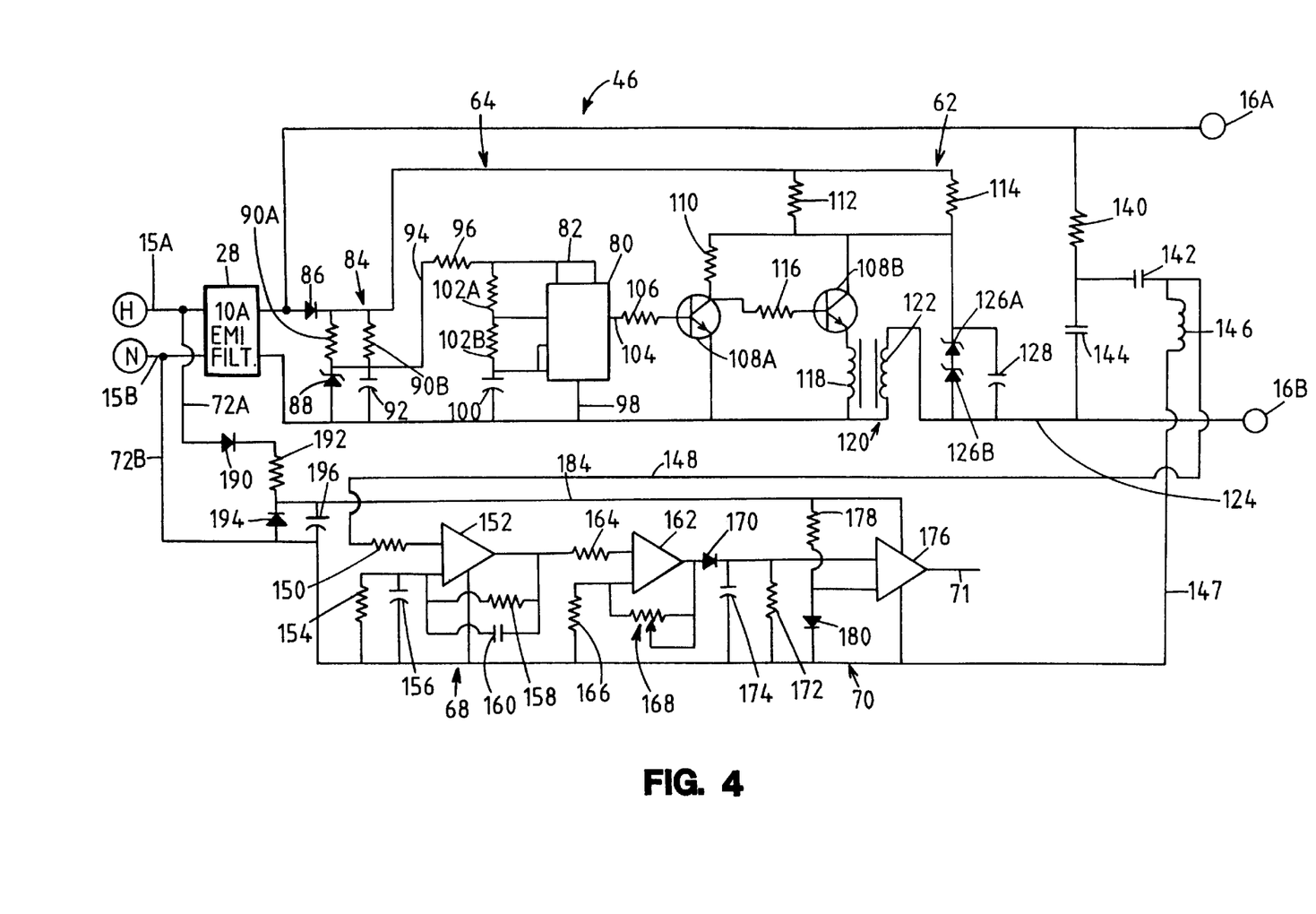
FIG. 4 is a more detailed schematic representation of the sensing circuit of FIG. 3.

The oscillator 80 is powered via a line 82, which couples the oscillator 80 to an AC-to-DC power converter circuit indicated generally at 84. The power converter circuit 84 includes a diode 86 that rectifies the power signal on the power line 15A and a zener diode 88 that sets the DC voltage of the power supplied to the oscillator 80 at a level near the breakdown voltage of the zener diode 88. The AC-to-DC converter 84 also includes a pair of resistors 90A and 90B and a capacitor 92 for removing any ripple in the rectified power signal. It should be noted that the resistors 90A and 90B may be replaced by a single resistor in an alternative embodiment in which appropriate component values are available.

The AC-to-DC converter 84 outputs a DC power signal of approximately 12 Volts on a line 94 to the oscillator 80 via a current-limiting resistor 96 that drops the supply voltage to an acceptable level. In general, the operation of an oscillator such as the above-identified integrated circuit chip is well known to those skilled in the art, and thus will not be described in detail herein. However, in this embodiment, the DC power signal is supplied to the integrated circuit via two input ports that correspond with a power input port and a reset port. The oscillator 80 receives a reference voltage via a line 98, which, in turn, is coupled to the low voltage power line 15B. A capacitor 100 and resistors 102A and 102B form a circuit that charges to a threshold voltage and discharges during oscillation. As a result, the voltage divider formed by the resistors 102A and 102B determines the frequency of the high frequency signal developed by the oscillator 80 on a line 104 to the transmitter 62.

The high frequency signal is current-limited by a gate resistor 106 and then amplified by a two-stage amplifier having a pair of power transistors 108A and 108B. The transistors 108A and 108B have collector terminals coupled to the AC-to-DC converter 84 via resistors 110, 112, and 114. It should be noted that the resistors 112 and 114 may be replaced by a single resistor in an alternative embodiment in which appropriate component values are available. An additional gate resistor 116 couples the collector of the transistor 108A to the gate of the transistor 108B. The emitter of the transistor 108B provides an output signal of the two stage amplifier to a primary winding 118 of a transformer indicated generally at 120. The output signal may have a peak-to-peak voltage of approximately 16 Volts. In general, the transformer 120 steps down the output signal to produce a transmission signal having a lower voltage. For example, the transformer 120 may comprise a ferrite rod core (not shown) and a secondary winding 122 having 100 turns of 18AWG wire, which results in a transmission signal having a peak-to-peak voltage of approximately 0.70 to 1.0 Volts and a frequency equal to the high frequency of the signal on the line 104. The transmission signal is coupled to the terminal 16B of the power outlet 12 by a line 124 for propagation down one of the power cord lines of the power tool 11 or other electrical device coupled thereto.

The transmitter 62 also includes a pair of zener diodes 126A and 126B and a capacitor 128 that establish a DC voltage of approximately 20–25 Volts at a node corresponding with the collector of the transistor 108B. These components provide the DC collector supply for the power transistors 108A and 108B and, in turn, a source of drive current for the transformer 120. In an alternative embodiment, the pair of zener diodes are replaced by a single zener diode having an appropriate breakdown voltage.

As set forth hereinabove, once the electrical plug of a device is inserted into the power outlet 12, the terminals 16A and 16B are coupled to an electrical circuit including the two electrical wires (not shown) in the cord leading from the plug to the device. The close proximity of the two wires in the cord leads to the inducement of a signal in the wire coupled to the terminal 16A. To test for the presence of the induced signal at the terminal 16A of the power outlet 12, the detector 66 is coupled thereto by a resistor 140 and a capacitor 142, which together present a small impedance at frequencies near the frequency of the induced signal. The resistor 140 and capacitor 142 provide, however, sufficient impedance at lower frequencies to reduce lower frequency noise, such as noise associated with the 60 Hz power line signal. A larger capacitor 144 reduces common mode noise between the terminals 16A and 16B.

The induced signal passing through the resistor 140 and the capacitor 142 is provided to an inductor 146 that removes any high frequency component therefrom to establish a reference ground signal for the detector 66 on a line 147. In this manner, the detector 66 is isolated to prevent spurious detection of a high frequency signal. The inductor 146 preferably comprises a ferrite core RF choke having an inductance of about 1.0 mH.

Non-spurious detection of the induced signal by the detector 66 begins with the receiver 68, which is coupled to the terminal 16A by a line 148. In general, the receiver 68 acts as a bandpass-tuned amplifier to selectively amplify those signal components having a frequency near the pertinent frequency. To this end, the induced signal on the line 148 is first supplied to a current-limiting resistor 150 and then to a non-inverting terminal of an op-amp 152. An RC circuit having a resistor 154 and a capacitor 156 is coupled to an inverting terminal of the op-amp 152, and a resistor 158 and a capacitor 160 establish the feedback path necessary for stable amplification. As is known to those skilled in the art, the resistances and capacitances of the RC circuit and the feedback path are selected to establish a bandpass frequency response for the receiver 68 such that the peak amplification of the op-amp 152 occurs for components of the induced signal in a frequency range centered on (or at least including) the frequency of the transmitted signal.

The amplified signal produced by the op-amp 152 is provided to a non-inverting terminal of an op-amp 162 via a current-limiting resistor 164. A resistive network having a resistor 166 and a variable resistor indicated generally at 168 are coupled to an inverting terminal of the op-amp 162, which together allow the receiver 68 to provide an adjustable amount of amplification. The variable resistor 168 is then utilized to establish the sensitivity of the receiver 68.

The amplified signal developed by the receiver 68 is provided by the op-amp 162 to an AC-to-DC converter having a diode 170, a resistor 172, and a capacitor 174. The AC-to-DC converter, which may, but need not, be considered part of the receiver 68, develops a DC level representative of the amplitude of the induced signal that, in turn, is supplied to the comparator 70, which, in this embodiment, includes an op-amp 176. The inverting terminal of the op-amp 176 is tied to a voltage determined by a reference diode 180. The voltage set by the voltage drop of the diode 180 constitutes a threshold voltage of about 0.7 Volts for comparison with the DC level developed by the AC-to-DC converter. In other words, the diode 180 assures that noise appearing on the line 147 does not falsely trigger the comparator 70. A resistor 178 is included to limit the current provided to the diode 180.

The DC level developed by the AC-to-DC converter is provided to the non-inverting terminal of the op-amp 176 such that, in the event that the DC level exceeds the threshold voltage, the op-amp 176 produces a signal on the line 71 approximately equal to the upper rail of the op-amp 176, i.e., the voltage of the signal provided via a line 184 for powering the op-amp 176. In the event that the DC level does not exceed the threshold voltage, the output of the op-amp 176 assumes the voltage of the lower rail, which is approximately equal to the reference voltage established for the detector 66 on the line 147. In this manner, the detector 66 develops a signal on the line 71 indicative of whether the power tool 11 or some other electrical device is coupled to the terminals 16A and 16B.

The power signal for the op-amps 152, 162, and 176 (which preferably reside on the same integrated circuit chip) is developed from the high voltage power line 15A by an AC-to-DC converter having a diode 190, a resistor 192, a zener diode 194, and a capacitor 196. The DC voltage of the power signal is established by the breakdown voltage of the zener diode 194, which may be about 12 Volts with reference to the ground signal on the line 147.

The op-amps 152, 162, and 176 may comprise low power op-amps available from National Semiconductor Corp. as part number LM 358 that have been optimized for single supply operation (as opposed to a bipolar supply, such as +12/−12 Volts).

The predetermined threshold utilized to determine the output of the detector 66 may be considered to be established by a combination of the components of the receiver 68 and the comparator 70. That is, the comparison performed by the comparator 70 depends upon the amount of amplification provided by the receiver 68. Thus, it shall be understood by those skilled in the art that numerous alternative schemes may be devised to determine whether the signal detected by the detector 66 is sufficiently strong to signify that a signal has been induced due to the presence of a power cord coupled to the power outlet 12.

Similarly, it should also be understood that certain circuit components described above in connection with the generator 64 may be alternatively described as a part of the transmitter 62. For example, the transistors 108A and 108B and the elements coupled immediately thereto may be associated with both signal generation and signal transmission.

Figure 5A:
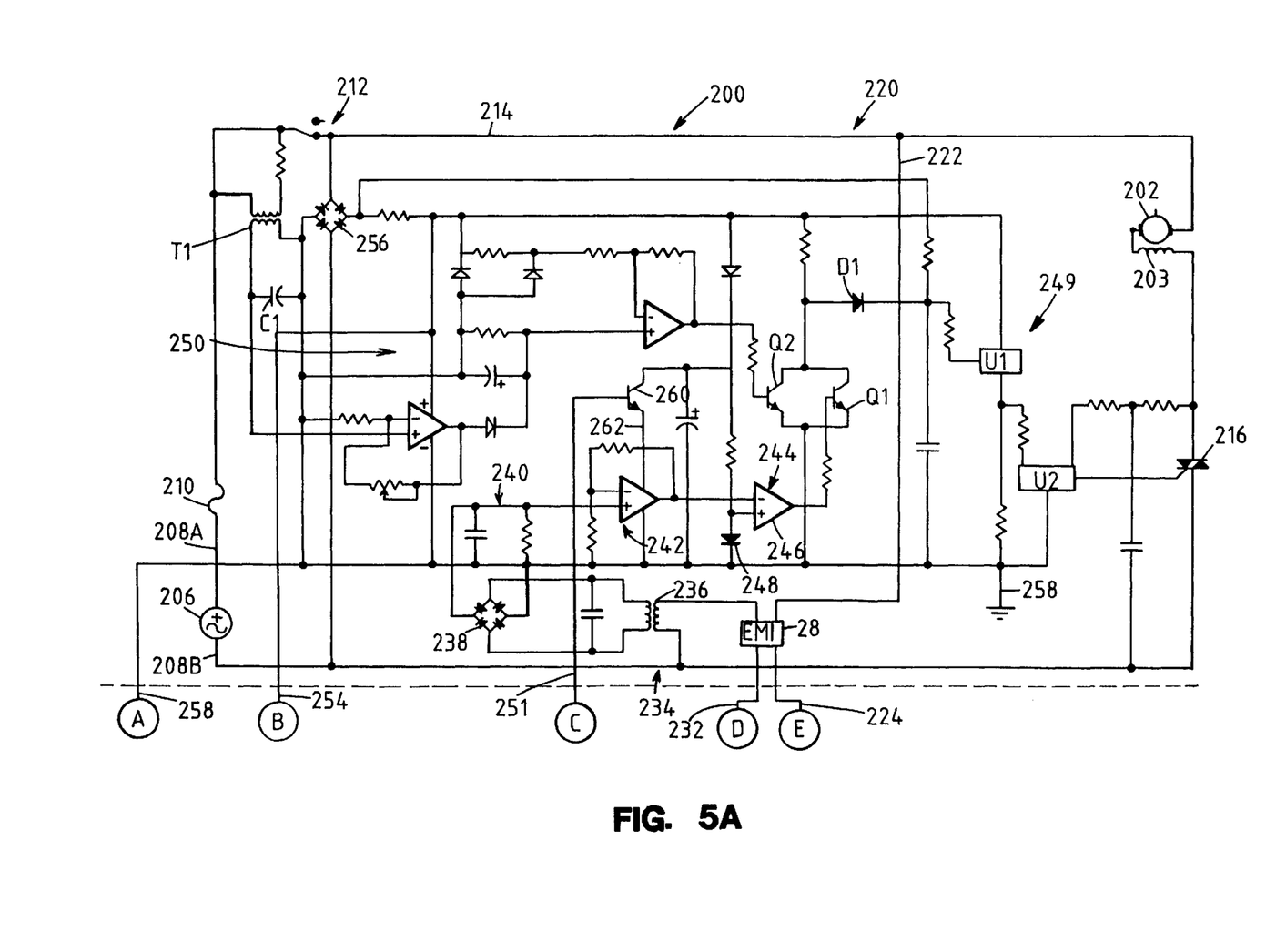
FIGS. 5A and 5B together provide a more detailed schematic representation of the control circuit of FIG. 2 having the sensing circuit of FIG. 4 incorporated therein in accordance with another aspect of the present invention.
Figure 5B:
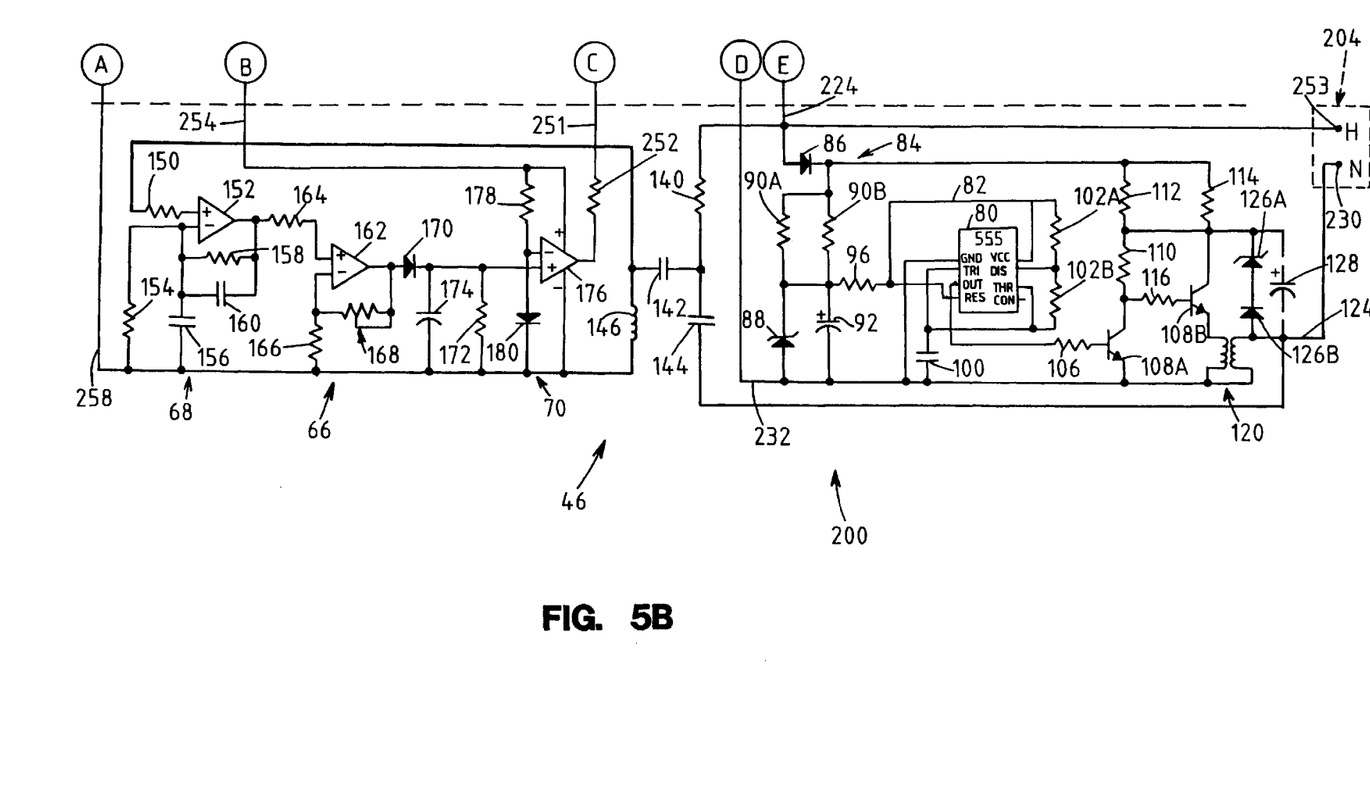

In accordance with one aspect of the present invention, it would be desirable to utilize the above-described sensing circuit 46 to provide for both conditional and independent operation of a vacuum motor. As set forth hereinabove in connection with FIG. 2, the sensing circuit 46 may be utilized to achieve such functionality with a two-position switch providing two choices for a user corresponding with "OFF" (OPEN) and "ON" (CLOSED) positions. FIGS. 5A and 5B, when combined along dashed lines and connected at like letters, show a schematic of the sensing circuit 46 as incorporated into a control circuit indicated generally at 200. The control circuit 200 controls operation of a vacuum cleaner having a vacuum motor 202 (FIG. 5A) and a power outlet indicated generally at 204 (FIG. 5B). The vacuum motor 202 is represented schematically as an inductive load having an inductance 203. The vacuum cleaner, in general, is powered by a power source 206 having a high voltage power line 208A and a low voltage power line 208B. A circuit breaker 210 is also included to protect the control circuit 200 from currents greater than a predetermined level, such as 12 Amps rms.

The control circuit 200 includes a two-position switch indicated generally at 212. When the switch 212 is disposed in the ON position, the vacuum motor 202 is coupled to the power source 206 via a line 214. However, the control circuit 200 further includes a triac 216 coupling the power source 206 to the vacuum motor 202 such that the triac 216 must be fired (i.e., activated) in order for power to be supplied to the vacuum motor 202. The remainder of the control circuit 200 is devoted to determining the manner in which, and the conditions under which, the triac 216 will be fired.

Initially, if the two-position switch is disposed in the OFF position, power is not supplied to either the vacuum motor 202 or the control circuit 200. As a further result, the power outlet 204 is not electrically coupled to the power source 206 and the power tool or other electrical device may not be activated.

When the two-position switch 212 is toggled to the ON position, the vacuum cleaner enters one of two modes dependent upon whether the power tool or other electrical device is coupled to the power outlet 204. More particularly, the control circuit 200 causes the vacuum cleaner to enter either the AUTO mode or the INDEPENDENT mode. As described hereinabove, the INDEPENDENT mode is entered when the sensing circuit 46 does not detect the presence of the power tool or other electrical device coupled to the power outlet 204. This mode provides for independent activation and operation of the vacuum motor 202 such that the vacuum motor 202 will be activated and running at or near its full rated speed upon disposition of the switch 212 in the ON position. As set forth hereinabove, operation of the vacuum motor 202 in connection with the control circuit 200 may result in delivery of a predetermined maximum magnitude of power that results in a speed slightly less than the full rated speed.

The AUTO mode is entered when the sensing circuit 46 detects the presence of the power tool or other electrical device. In the AUTO mode, operation of the vacuum motor 202 is conditioned upon operation of the power tool or other electrical device. That is, while the power tool remains inactive, the vacuum motor 202 is not activated. Once the power tool is activated, however, a regulating circuit indicated generally at 220 (FIG. 5A) senses current flowing to the power tool and regulates the power supplied to the vacuum motor 202 in accordance with the amount of electrical energy being consumed by the power tool in order to limit the total power to a predetermined limit, such as 12 Amps.

The operation of the sensing circuit 46 remains substantially the same as described in connection with FIG. 4, where like elements are identified with like reference numerals, but will now be further described in conjunction with the operation of the regulating circuit 220. With the two-position switch 212 disposed in the ON position, power is supplied to the high frequency generator 64 via a line 222, the EMI filter 28, and a further line 224. The 60 Hz line power is converted to a DC power voltage by the AC-to-DC converter 84 as described above and provided to the oscillator 80 via the resistor 96 and the line 82. Other details regarding the development of the high frequency signal by the oscillator 80 remain the same or similar to those described hereinabove.

The high frequency signal is amplified by the transistors 108A and 108B of the transmitter 62 and provided to the transformer 120, which develops the transmitted signal on the line 124 for transmission to one of the terminals of the power outlet 204, but preferably a neutral terminal 230 of the power outlet 204.

The neutral terminal 230 of the power outlet 204 is coupled to the low voltage power line 208B of the power source 206 by a line 232 and the EMI filter 28, which prevents any back propagation of high frequency signal components. The current path to the neutral terminal 230 then passes through a tool current sensing circuit 234 of the regulating circuit 220. The tool current sensing circuit 234 may correspond with the current sensor 30 of FIG. 2. The tool current sensing circuit 234 includes a transformer 236 and generally develops a signal indicative of whether power or current is being supplied to the power tool or other electrical device. The transformer 236 develops an AC signal representative of the tool current, which is rectified by a full-bridge rectifier 238 and then filtered and amplified by an RC circuit 240 and an op-amp circuit 242 coupled thereto.

This DC signal developed by the op-amp circuit 242 is provided to a comparator circuit 244 having an op-amp 246. The comparator circuit 244 generally compares the DC signal representative of the tool current to a reference signal established in part by a diode 248. The reference signal is set such that once the power tool or other electrical device draws a current greater than about 125 mA, the reference signal is exceeded by the DC signal representative of the tool current.

The comparator circuit 244 develops an output signal approximately equal to the high or low power rail for the op-amp 246 depending upon whether the DC signal exceeds the reference signal. Initially, if there is little or no tool current, the output of the comparator circuit 244 assumes a high voltage level such that a transistor Q1 of a phase control circuit 249 conducts. Consequently, the voltage at the collector of the transistor Q1 is brought down to the reference ground for the regulating circuit 220. This voltage is applied to a unijunction transistor (UJT) U1 of the phase control circuit 249 via a diode D1 that sets a biasing voltage for the UJT U1. Alternatively, the diode D1 is replaced by a resistor having a resistance (e.g., 15 kΩ) selected to set the biasing voltage to a particular level. The UJT U1 is coupled to an optoisolator circuit U2 for developing triac triggering pulses for the triac 216. Applying the (low voltage) reference ground to the UJT U1 does not allow the UJT U1 to supply current pulses to the optoisolator U2. As a result, no triac triggering pulses are generated and, thus, the triac 216 does not permit current flow to the vacuum motor 202.

If the DC signal developed by the op-amp circuit 242 exceeds the predetermined threshold (meaning that the tool current is drawing more than 125 mA), the output of the comparator circuit 244 assumes the low voltage approximately equal to the reference ground. As a result, the transistor Q1 is non-conductive, and the voltage at the collector terminal of the transistor Q1 is determined by the amount of current flowing through a transistor Q2. The state of the transistor Q2 is, in turn, controlled by a correction circuit indicated generally at 250.

The correction circuit 250 develops a correction signal generally indicative of the extent to which the total current supplied to both the vacuum motor 202 and the power tool exceeds a predetermined level. The phase control circuit 249, in turn, develops triggering pulses for the triac 216 in accordance with the voltage magnitude of this correction signal. To generate the correction signal, the correction circuit 250 generally includes the sensor 38 of FIG. 2 and an op-amp circuit coupled thereto that compares a predetermined level to a parameter of the electrical energy supplied to at least one of the vacuum motor 202 and the power tool. In an exemplary embodiment, the sensor 38 includes a transformer T1 that taps the current flowing to the vacuum motor 202 and the power tool to generate a signal representative of the magnitude thereof. This current signal may then be filtered by a capacitor C1 (e.g., 4.7 $\mu$F) and passed to the op-amp circuit for the comparison that determines the magnitude of the correction signal. Further description of the manner in which the correction signal is generated, and of the general operation of the components of the tool current sensor 234, the phase control circuit 249, and the correction circuit 250, may be found in U.S. Pat. No. 5,747,973, the disclosure of which is hereby incorporated by reference.

The tool current sensor 234 and the remainder of the regulating circuit 220 are responsive to the enabling signal developed by the detector 66 of the sensing circuit 46 to enable the above-described components of the regulating circuit 220 to develop triac triggering pulses. With continued reference to FIGS. 5A and 5B, the enabling signal is developed on a line 251 by the comparator 70 of the detector 66 via a current-limiting resistor 252. As described hereinabove, the enabling signal is indicative of whether the power tool or other electrical device is coupled to the power outlet 204. To this end, the receiver 68 generates a signal representative of the induced signal in the power cord line coupled to a terminal 253 of the power outlet 204. The receiver 68 is supplied with power from the regulating circuit 220 via a line 254, which carries a pulsating DC power signal developed by a full-wave bridge rectifier 256. The reference ground is also shared between the regulating circuit 220 and the receiver 68 via a line 258, which is coupled to the inductor 146 described hereinabove.

Other components of the detector 66 shown in FIG. 5B generally operate in a fashion similar to that described hereinabove and will not be further described. In general, however, the enabling signal developed by the comparator 70 assumes a high voltage in the event that the power tool is coupled to the power outlet 204, and a low voltage in the event that power tool is not coupled to the power outlet 204.

To determine whether the vacuum cleaner will enter the AUTO or INDEPENDENT mode, the enabling signal on the line 251 is provided as a control signal to a switch 260, which may comprise an NPN transistor as shown in FIG. 5A or any other switching device known to those skilled in the art to toggle between conductive and non-conductive states based on a control signal. When the enabling signal assumes a high voltage, the switch 260 becomes conductive such that the power signal developed by the full-bridge rectifier 256 is provided to the op-amp circuit 242 via a line 262. The line 262 should also be understood to supply power to the op-amp 246, inasmuch as the op-amps 242 and 246 preferably reside on the same integrated circuit chip. Thus, the op-amps 242 and 246 will only be powered when the detector 66 detects that a power tool or other electrical device is coupled to the power outlet 204.

When the power tool is not detected, the op-amps 242 and 246 are not powered and, therefore, the output of the comparator circuit 244 assumes a low voltage. This low voltage, in turn, causes the transistor Q1 to become non-conductive. As described above, the voltage applied to the UJT U1 is then controlled by the extent to which the transistor Q2 is conducting, which is determined by the correction signal developed by the correction circuit 250. Because the vacuum motor 202 may be designed to draw less current than the maximum current permitted by the correction circuit 250 for the combination of the vacuum motor 202 and the power tool (e.g., 12 Amps), the correction signal may direct the phase control circuit 249 to fire the triac 216 such that the vacuum motor 202 is provided with unregulated power, and the vacuum cleaner is then considered to be operating in the INDEPENDENT mode. Alternatively, the power supplied to the vacuum motor 202 may be regulated to a slight extent due to operation via the phase control circuit 249, and also if the full rated speed of the vacuum motor 202 would result in more current than the maximum current permitted by the correction circuit 250.

Once the power tool is detected, the enabling signal assumes a high voltage such that the op-amps 242 and 246 are supplied with power. In this manner, the enabling signal enables the current sensor 30 of FIG. 2 to control whether the transistor Q1 will either be conductive or non-conductive based upon whether the current sensor 30 detects any current flow to the power tool. The vacuum cleaner now resides in the AUTO mode for conditioned operation of the vacuum motor 202. Initially, with the tool inactive, the output of the comparator circuit 244 is high, and the transistor Q1 does not allow firing pulses to be applied to the triac 216 as described hereinabove. However, once the tool current exceeds 125 mA, the output of the comparator circuit 244 assumes a low voltage, and the transistor Q2 controls the voltage applied to the UJT U1. In this manner, the correction signal applied to the transistor Q2 determines the duty cycle of the triac 216 and, by implication, the amount of current drawn by the vacuum motor 202. Because the power tool may begin to draw enough current such that the total current drawn by the combination would exceed a predetermined level, the correction signal regulates the current drawn by the vacuum motor 202 by adjusting the duty cycle of the triac 216 to reduce the current drawn by the vacuum motor 202 as necessary.

The above-identified components of the sensing circuit 46 preferably have the following values, it being understood that the values are exemplary only and may vary from those shown and still embody the present invention:

| Component | Value |
| --- | --- |
| Resistor 90A | 4.7 k$\Omega$ |
| Resistor 90B | 4.7 k$\Omega$ |
| Capacitor 92 | 100 $\mu$F |
| Resistor 96 | 470 $\Omega$ |
| Capacitor 100 | 220 pF |
| Resistor 102A | 1.0 k$\Omega$ |
| Resistor 102B | 10.0 k$\Omega$ |
| Resistor 106 | 15 k$\Omega$ |
| Resistor 110 | 27.0 k$\Omega$ |
| Resistor 112 | 4.7 k$\Omega$ |
| Resistor 114 | 4.7 k$\Omega$ |
| Resistor 116 | 1.0 k$\Omega$ |
| Capacitor 128 | 40.0 $\mu$F |
| Resistor 140 | 100 k$\Omega$ |
| Capacitor 142 | 220 pF |
| Capacitor 144 | 0.10 $\mu$F |
| Resistor 150 | 12 k$\Omega$ |
| Resistor 154 | 12 k$\Omega$ |
| Capacitor 156 | 220 pF |
| Resistor 158 | 18 k$\Omega$ |
| Capacitor 160 | 220 pF |
| Resistor 164 | 10 k$\Omega$ |
| Resistor 166 | 10 k$\Omega$ |
| Variable Resistor 168 | 1.0 M$\Omega$ (maximum) |
| Resistor 172 | 10 k$\Omega$ |
| Capacitor 174 | 4.7 $\mu$F |
| Resistor 182 | 4.7 k$\Omega$ |

-continued

| | |
|---|---|
| Resistor 192 | 10 kΩ |
| Capacitor 196 | 22 μF |
| Resistor 252 | 180 kΩ |

Exemplary values for the circuit components of the regulating circuit 220 may be found in U.S. Pat. No. 5,747,973.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications that are within the scope of the appended claims is reserved.

What is claimed is:

1. A sensing circuit for use with a power outlet having a first terminal and a second terminal and a device having power supplied thereto via the power outlet, comprising:
   a generator that develops a first signal having a high frequency;
   a transmitter coupling the generator to the first terminal of the power outlet to supply the first signal thereto; and
   a detector coupled to the second terminal of the power outlet and tuned to the high frequency to develop a second signal indicative of whether the device is coupled to the power outlet.

2. The sensing circuit of claim 1, wherein:
   the generator comprises an oscillator; and
   the transmitter comprises a transformer coupling the oscillator to the first terminal of the power outlet.

3. The sensing circuit of claim 1, wherein the detector comprises a bandpass-tuned amplifier tuned in accordance with the high frequency of the first signal.

4. The sensing circuit of claim 1, wherein the detector comprises:
   a receiver tuned in accordance with the high frequency of the first signal; and
   a comparator coupled to the receiver to develop the second signal.

5. The sensing circuit of claim 4, wherein the receiver comprises an AC-to-DC converter that develops a DC signal supplied to the comparator for comparison with a threshold voltage.

6. The sensing circuit of claim 1, in combination with:
   a load having the power outlet disposed thereon; and
   a regulator coupled to the detector and enabled by the second signal to condition operation of the load on operation of the device.

7. The combination of claim 6, wherein the load comprises a two-position switch that controls whether power is supplied to the load and the device.

8. The combination of claim 6, wherein the regulator comprises a current sensor coupled to the power outlet for developing a third signal indicative of whether power is being supplied to the device.

9. The combination of claim 6, wherein the power outlet is disposed on a vacuum cleaner and the device comprises an auxiliary power tool.

10. The sensing circuit of claim 6, in further combination with a two-position switch wherein the two-position switch couples the second terminal of the power outlet to a high voltage line of a power source.

11. A control circuit for controlling operation of a first load in connection with operation of a second load powered via a power outlet, comprising:
   a signal generator coupled to the power outlet;
   a detector coupled to the power outlet to develop a first signal indicative of whether the second load is coupled to the power outlet;
   a sensor coupled to the power outlet to develop a second signal indicative of whether power is supplied to the second load; and
   a switch circuit coupled to the first load and responsive to the first and second signals to provide for operation of the first load conditioned upon operation of the second load.

12. The control circuit of claim 11, wherein:
   the power outlet comprises a first terminal and a second terminal;
   the signal generator is coupled to the first terminal; and
   the detector is coupled to the second terminal.

13. The control circuit of claim 12, further comprising a transmitter wherein:
   the signal generator comprises an oscillator; and
   the oscillator is coupled to the first terminal of the power outlet by the transmitter.

14. The control circuit of claim 11, wherein the switch circuit comprises a triac coupled to the first load and a triac triggering circuit responsive to the second signal.

15. The control circuit of claim 14, wherein the triac triggering circuit comprises a phase control circuit to adjust power supplied to the first load.

16. The control circuit of claim 15, further comprising a two-position switch having an open position and a closed position wherein the two-position switch couples the power outlet and the first load to a power source when disposed in the closed position.

17. The control circuit of claim 16, wherein the switch circuit allows power to be supplied to the first load when the two-position switch is disposed in the closed position and the first signal indicates that the second load is not coupled to the power outlet.

18. The control circuit of claim 16, wherein the switch circuit does not allow power to be supplied to the first load when the two-position switch is disposed in the closed position, the first signal indicates that the second load is coupled to the power outlet, and the second signal indicates that current is not flowing to the second load.

19. The control circuit of claim 16, further comprising a further sensor that develops a third signal indicative of a parameter of the electrical energy supplied to at least one of the first and second loads wherein the phase control circuit variably adjusts power supplied to the first load in accordance with the third signal when the two-position switch is disposed in the closed position, the first signal indicates that the second load is coupled to the power outlet, and the second signal indicates that current is flowing to the second load.

20. A vacuum cleaner for use with a power tool and having a motor, comprising:
   a power outlet having a first terminal and a second terminal and configured to supply power to the power tool; and
   a control circuit coupled to the power outlet wherein the control circuit comprises:
      a generator coupled to the first terminal of the power outlet that develops a first signal having a high frequency;

a detector coupled to the second terminal of the power outlet and tuned in accordance with the high frequency of the first signal to develop a second signal indicative of whether the power tool is coupled to the power outlet;

a switch having a state; and a regulating circuit responsive to the second signal and the state of the switch to control power supplied to the motor.

21. The vacuum cleaner of claim 20, wherein the switch comprises a two-position switch having an open position and a closed position.

22. The vacuum cleaner of claim 21, wherein the regulating circuit supplies a predetermined maximum magnitude of power to the motor when the two-position switch is disposed in the closed position and the second signal indicates that the power tool is not coupled to the power outlet.

23. The vacuum cleaner of claim 21, wherein the regulating circuit comprises a phase control circuit.

24. The vacuum cleaner of claim 20, wherein the control circuit further comprises a transmitter that couples the generator to the first terminal of the power outlet.

25. The vacuum cleaner of claim 24, wherein:

the transmitter comprises a transformer; and the generator comprises an oscillator coupled to the transformer.

26. The vacuum cleaner of claim 20, wherein the detector comprises a bandpass-tuned amplifier tuned in accordance with the high frequency of the first signal.

27. The vacuum cleaner of claim 26, wherein the detector further comprises:

an AC-to-DC converter coupled to the bandpass-tuned amplifier; and a comparator coupled to the AC-to-DC converter and responsive to a predetermined threshold to develop the second signal.

28. The vacuum cleaner of claim 20, wherein the regulating circuit comprises a sensor coupled to the power outlet that develops a third signal indicative of whether current is flowing to the power tool.

29. The vacuum cleaner of claim 28, wherein the regulating circuit further comprises an amplifier coupled to the sensor and enabled by the second signal.

30. A vacuum cleaner that controls operation of a first load in connection with operation of a second load, comprising:

a power outlet adapted to couple the second load to the vacuum cleaner;

a two-position switch having a first position and a second position; and a control circuit coupled to the two-position switch and the power outlet wherein:

the control circuit conditions the operation of the first load upon the operation of the second load when the two-position switch is disposed in the first position and the control circuit detects that the second load is coupled to the power outlet; and the control circuit allows the first load to operate independently of the second load when the control circuit does not detect that the second load has been coupled to the power outlet.

31. The vacuum cleaner of claim 30, wherein the control circuit comprises a generator coupled to the power outlet that develops a high frequency signal.

32. The vacuum cleaner of claim 30, wherein the control circuit comprises a detector coupled to the power outlet and tuned to detect a high frequency signal to develop a signal indicative of whether the second load is coupled to the power outlet.

33. The vacuum cleaner of claim 30, wherein the first position and the second position correspond with a closed position and an open position, respectively.

34. The vacuum cleaner of claim 33, wherein the control circuit does not allow power to the first load or the second load when the two-position switch is disposed in the second position.

35. The vacuum cleaner of claim 30, wherein the first load comprises a vacuum motor and the second load comprises a power tool.

* * * * *